United States Patent [19]

Brennen et al.

[11] Patent Number: 4,644,248

[45] Date of Patent: Feb. 17, 1987

[54] LINE FAULT TOLERANT SYNCHRONOUS TIMING REFERENCE GENERATOR FOR STATIC VAR GENERATORS

[75] Inventors: Michael B. Brennen, Pittsburgh; Alberto Abbondanti, Penn Hills Township, Allegheny County, both of Pa.

[73] Assignee: Westinghouse Electric Corp., Pittsburgh, Pa.

[21] Appl. No.: 790,681

[22] Filed: Oct. 23, 1985

[51] Int. Cl.⁴ .......................... H02J 3/18; H03K 5/05
[52] U.S. Cl. .................................... 323/205; 323/299; 307/269; 307/595; 307/597; 307/603
[58] Field of Search ....................... 323/205, 208–211, 323/299; 307/269, 595, 597, 602, 603; 361/62–66; 331/DIG. 2

[56] References Cited

U.S. PATENT DOCUMENTS

| | | | |
|---|---|---|---|
| 3,987,360 | 10/1976 | Brennen et al. | 323/211 |
| 3,999,117 | 12/1976 | Gyugyi et al. | 323/211 |
| 4,016,511 | 4/1977 | Ramsey et al. | 307/603 X |
| 4,496,861 | 1/1985 | Bazes | 307/603 X |

*Primary Examiner*—Peter S. Wong
*Attorney, Agent, or Firm*—J. V. Pezdek

[57] ABSTRACT

A timing reference generator for producing a multi-phase timing reference signal in synchronism with a multi-phase source voltage signal is disclosed. The timing reference generator uses an N stage array of series connected phase-locked loop (PLL) circuits to preserve the prefault condition of an input source signal by open circuiting at least the Nth stage prior to the propagation of the fault condition signal through the array. The open circuited stage acts like a flywheel to preserve the prefault condition of the source signal. This output can be used to replace the lost source signal until the fault condition has cleared. The output of the first PLL is used to provide the timing reference signals. This arrangement allows for sensing delays in establishing the occurrence of a fault and the consequent delay in activation of the flywheel. The first PLL comprises a positive sequence type phase detector and series connected band reject harmonic filters in order to eliminate phase errors caused by input voltage unbalance and input harmonic content. Subsequent PLL circuits are of the zero phase error type. Multiple faults are tolerated if two stages of the array are connected in parallel and alternately operated as flywheels. The flywheels are sequenced so that one is kept operating as a flywheel while the other one settles.

8 Claims, 5 Drawing Figures

LINE FAULT TOLERANT SYNCHRONOUS TIMING REFERENCE GENERATOR FOR STATIC VAR GENERATORS

CROSS-REFERENCE TO RELATED APPLICATIONS

The material presented herein is related to the material presented in the copending application Ser. No. 790,680, filed Oct. 23, 1985 entitled "A Multiphase Frequency Selective Phase-Locked Loop with Multiphase Sinusoidal and Digital Outputs", now abandoned.

FIELD OF THE INVENTION

This invention relates to apparatus used for static VAR generators and in particular timing reference circuits for producing synchronous timing signals used as firing angle references for switching or phase control.

BACKGROUND OF THE INVENTION

In many types of static power conversion equipment, such as static VAR generators (SVG's), the controllability of the required output relies on the availability of synchronous timing signals. The synchronous timing signals are used, generally, as firing angle references for switching or phase control. In SVG's that essentially consist of thyristor controlled reactors and thyristor switched capacitors, the timing signals are derived from the voltage of electric power transmission lines. An example of an SVG control with reference to timing signals is described in U.S. Pat. No. 3,999,117, issued Dec. 21, 1976 and entitled "Control Apparatus for Static VAR Generators and ARC Furnace Flicker Compensators". A timing reference generator for arc furnace flicker compensators is described in U.S. Pat. No. 3,987,360 issued Oct. 19, 1976 entitled "High Accuracy Fast Recovery Reference Timing Generator for a Static VAR Generator". The synchronous timing signals are, essentially, digital pulses that are locked in prescribed and steady phase relationships with the transmission line voltage signals. When, after start-up, the phase relationships are established, that is the timing reference generator has "captured" or locked onto the transmission line voltage signals, the phase of the output signals will track within specified rate of change of frequency variations of the electric power network. The maximum phase error during tracking must also stay within prescribed limits.

One of the most critical timing requirements is faced in power utility type SVG's. A major function of utility type SVG's is to preserve power system stability after inadvertent line faults (short circuits). During a line fault, the voltage may completely disappear or may become grossly distorted for several line voltage periods, typically 3-6 cycles. The SVG cannot regulate the system during a fault due to the lack of system voltage or excessive voltage unbalance. However, it is extremely important that after the fault has cleared, the SVG resumes its control of the transmission network as soon as possible.

As described in U.S. Pat. No. 3,987,360, a timing reference generator can be based on a phase-locked type circuit. Typically the phase-locked loop circuit is comprised of a phase detector, a loop filter or integrator, and a voltage controlled oscillator (VCO) whose output is the timing reference signal. The output of the VCO and the line voltage signal serve as the input to the phase detector. The phase-locked loop is designed so that the timing reference signal output will lock onto and track the line voltage signal in a predetermined phase relationship. There are certain operational advantages if the generation of timing references is based on the fundamental (60 Hz) positive sequence component of the measured, multi-phase system voltages. A positive sequence based timing reference generator can be implemented by a positive sequence locked loop described in the cross referenced application. The positive sequence locked loop described there also employs phase locked loop techniques. A high accuracy timing reference can be made using this circuit by inserting band reject filters in the positive sequence locked loop. This circuit would be accurate even in the case of system voltage unbalance and (second) harmonic content. For example, the insertion of a second harmonic band reject filter eliminates the significant phase errors caused by even a typically small amount (2%) of steady state voltage unbalance. An additional series third harmonic band reject filter will eliminate phase errors caused by the presence of balanced second harmonics also. A third fundamental (60 Hz) band reject filter eliminates the effect of unbalanced second harmonics and dc offset in the input signals. A large amount of second harmonic content is generally observed right after clearing of faults.

Unfortunately, even the above, improved positive sequence locked loop cannot override severe line faults when practically all of the line voltages disappear. The phase locked loop tends to interpret the disappearance of the voltage as a large phase error (one approaching 180 degrees) and quickly but also incorrectly alters the phase of the synchronous output signals. During the fault, the synchronism is lost and, in worst case, a full signal recapture, i.e. starting from an initial phase error of 180 degrees, and output settling will be required from the phase locked loop. This also means that there is no usable timing reference immediately after fault clearance when it is needed the most for fast corrective action by the SVG.

In order to preserve its prefault phase position, the normal closed phase locked loop (PLL) could, theoretically, be opened before the phase detector affects the loop filter and, eventually, the voltage controlled oscillator (VCO) that provides the timing references. This can be implemented by placing a switch in the signal line between the phase detector and the loop filter. Normally, the disconnect switch is closed (ON). This allows capturing and tracking the input voltage. When the input and output signals are in phase, the phase detector output is zero (open circuit). For lagging and leading phase errors, the phase detector injects a respective proportional positive or negative charge into the loop filter. For example, when the phase of the output signal lags the input phase, the frequency of the VCO will increase and, consequently, its output phase will advance in time. Similarly, by appropriate modification of the VCO frequency, the loop can correct for phase leads. When the loop is settled, the output of the phase detector becomes zero. The switch can now be opened and only a very small phase drift is observed at the VCO output due to small circuit leakages. The PLL behaves as a mechanical "flywheel" with very high inertia.

The problem with this "flywheel" technique arises in providing the disconnect signal to the switch in time before the output phase becomes altered by the unpredictable beginning of the fault. The problem is due to the fact that the sensing time of the fault occurrence is comparable to the combined phase detector and loop filter time constant. The activation delay of the disconnect switch becomes less pronounced if the loop filter time constant is increased. Above a certain time constant, oscillatory tendency is observed in the SVG operation. The oscillatory tendency diminishes with further increase of the time constant, but at this point the PLL response becomes so slow that it cannot follow the specified rate of change of system frequencies with an acceptable phase error. No acceptable compromise can be found to obtain a high quality fault tolerant timing reference generator based on the simple flywheel technique described.

One subject of the present invention is to provide a line fault tolerant synchronous multiphase timing reference. Another object of the invention is to provide a multiphase timing reference circuit capable of withstanding a multiple line fault condition.

SUMMARY OF THE INVENTION

A timing reference generator for producing a multiphase timing reference signal in synchronism with a multi-phase source signal is disclosed. The timing reference generator comprises a primary phase-locked loop circuit, a phase-locked loop circuit array, fault detector, and feedback circuit. The primary phase-locked loop circuit locks on and tracks an input signal representative of the multi-phase source signal when at least one phase thereof is present. This circuit produces a multi-phase timing reference output signal based on the positive sequence component of the source signal. The primary phase-locked loop circuit maintains a predetermined phase relationship between the input signal and the timing reference output signal. The circuit includes at least one harmonic band reject notch filter to substantially eliminate phase errors in the timing reference output signal caused by input signal phase unbalance and harmonics. The phase-locked loop circuit array is comprised of N stages connected in series with each phase-locked loop stage having an input and output and comprising a zero phase error-type phase-locked loop circuit with an inverted output. The last stage is operable in one of two modes. The first is a tracking mode wherein the phase error between the input and output thereof is sampled on a predetermined cycle with the output being inverted and delayed with respect to the input. The second mode is a flywheel mode wherein the phase locked loop stage is open circuited with the output thereof being independent of the input and remaining essentially unchanged from its state existing just prior to entering the flywheel mode of operation. The initial stage of the phase locked loop array has as an input thereto at least one phase of the timing reference output signal with each subsequent stage receiving the output of the preceding stage. The output of the Nth stage of the array is in-phase with the input to the primary phase locked loop circuit. The total propagation delay for the array is determined by the number of stages provided.

A fault detector having a response time that is less than the total propagation delay of the phase error in the phase locked loop array is used to determine the presence of a fault condition in the multi-phase source signal. The fault detector includes means for open circuiting the Nth stage of the phase locked loop array during the fault condition. This places the Nth stage of the phase locked loop array in the flywheel mode of operation thereby preserving the pre-fault phase conditions of the source signal as represented by the output of the Nth stage. The feedback circuit is used to supply the output of the Nth stage of the phase locked loop array to the input of the primary phase locked loop circuit during the fault condition to replace the lost source signal.

In an alternate embodiment, an additional N'stage is placed in parallel with the Nth stage of the phase-locked loop array. A sequence selector responsive to the fault signal alternately selects between the Nth and N+1 stages for the operation thereof in the flywheel mode during the existence of a fault condition. The sequence selector includes means for inhibiting further selection between stages until a settle signal is received. A switching means responsive to the sequence selector open circuits the selected phase locked loop stage for the flywheel mode of operation. A flywheel settling monitor monitors the output of the unselected stage and the output of the primary phase-locked loop circuit after the fault signal has been cleared. The monitor produces an output settle signal when the phase error between the monitored outputs remains less than about one degree for a predetermined number of cycles at which time the feedback signals are replaced by those of the source signal. The unselected phase-locked loop stage is allowed to recapture and track while the selected phase-locked loop stage flywheels. Only after confirmation of settling of the tracking flywheel is the selected phase-locked loop stage allowed to track the input signal. If a second line fault occurs while one phase-locked loop stage is still settling, the output of the selected flywheel will be fed back to the input of the primary phase-locked loop. With this technique, repetitive faults can be handled.

BRIEF DESCRIPTION OF THE DRAWINGS

For a better understanding of the invention, reference may be made to the embodiments exemplary of the invention shown in the accompanying drawings, wherein.

DETAILED DESCRIPTION

Figure 1:
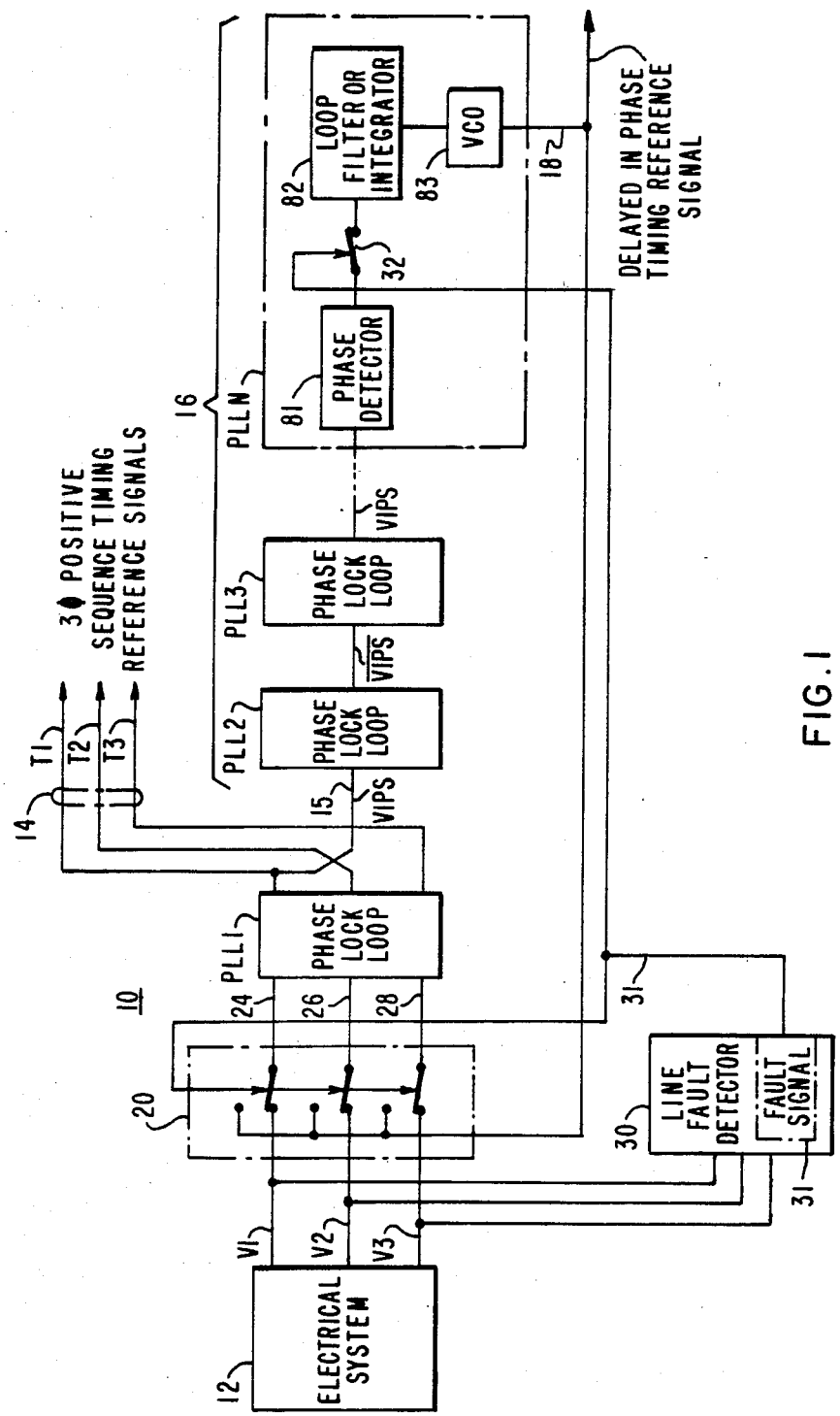
FIG. 1 is a block diagram representation of the circuit embodying the invention.

In order to satisfy the contradicting requirement of fast tracking response to the phase-locked loop (PLL) during normal operation on one hand and safe tolerance to the delay in sensing of the line transient on the other hand, a tapped array of series PLL's is provided. A timing reference generator embodying the invention is presented in FIG. 1. This configuration illustrates a three phase arrangement. Other numbers of phases can be used. Here the timing reference generator 10 is comprised of a first phase-locked loop, PLL1 having as inputs the line system voltages V1, V2, and V3 of an electrical system 12. These voltages are also referred to as the source signal. A multiphase timing reference signal 14 having a timing reference T1, T2, and T3 for each phase is produced by PPL1. The timing reference signal 14 is tapped off after phase-locked loop PPL1. At least one phase of the timing reference signal 14 serves as the input signal 15 to a series connected N-stage array 16 of PLL circuits numbered PLL2- PLLN. The input signal to the array is designated as V1PS. The output 18 of the Nth stage of the PLL array 16 is fed back to the input of phase-locked loop PLL1 through a two position, three pole, controlled switch 20. In one position of the switch 20, the line voltages V1, V2, and V3 are connected as inputs 24, 26, and 28, respectively, to phase-locked loop PLL1. In the other position the output 18 of Nth stage of the phase-locked loop array 16 is connected to at least one of the inputs to phase-locked loop PLL1. A line fault detector 30 is connected to the system 12 to detect the occurrence of a fault condition and produces a fault signal 31. The switch 20 is responsive to the fault signal 31. A second switch 32 also responsive to the fault signal 31 is provided to isolate phase-locked loop PLLN during the fault condition and place this portion of the array 16 in a flywheel mode of operation.

Under normal line voltage conditions the first phase locked loop, PLL1, is connected to the measured system voltages V1, V2, and V3 for the three phases. PLL1 is a fast tracking type of circuit that locks on the positive sequence component of the line voltage and incorporates band reject harmonic filters to eliminate phase errors in its output otherwise caused by line voltage unbalance and input harmonics as previously described. The number and frequency of the band reject filters depends on which harmonics are to be rejected. The output of the fast tracking PLL1 is appropriately decoded to provide the phases T1, T2, and T3 of the timing reference signal 14.

Figure 2:
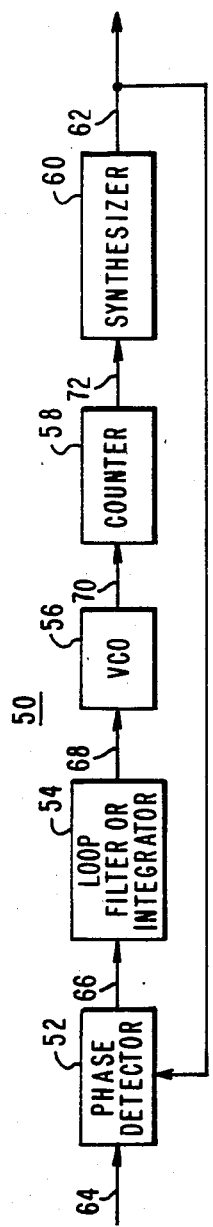
FIG. 2 is a block diagram representation of a phase locked loop circuit utilized for the first phase locked loop circuit.

A block diagram illustrating PLL1 is given in FIG. 2. There the PLL circuit 50 comprises a phase detector 52, a loop integrator 54, a voltage controlled oscillator 56, a counter 58, and a synthesizer 60. The output 62 of the synthesizer 60 and a source signal 64 representative of the line voltage serve as the inputs to the phase detector 52 that produces a phase error signal 66 which is the phase error between the two input signals. This phase error signal 66 is integrated by the integrator to provide a reference signal 68 as the input to the VCO 56. The magnitude of reference signal 68 causes VCO 56 to vary the frequency of its output 70 so as to drive the phase error signal 66 to zero. At this point the magnitude of reference signal 68 will stabilize and, in turn, stabilize the frequency of the output 70 of the VCO 56. The output 70 of the VCO serves as a clock signal for the counter 58. The counter is configured to be reset when a predetermined count value is reached. For example, one cycle of the output can be represented by a count value variable from 0 to 359 providing a 1 degree resolution. Other count values can be used. The count value output 72 is used by the synthesizer to produce a synthesized output having a predetermined amplitude based on the count value. In this manner a single phase or multiphase output having a predetermined phase relationship with the source signal can be produced. In the synthesizer, the amplitude information is typically stored in some form of nonvolatile memory and is converted to a sinusoidal waveform via a digital-to-analog converter. As the frequency of the output 70 of the VCO 56 varies the rate of counting by the counter 58 varies causing the output 62 of the synthesizer 60 to be advanced or retarded so as to decrease the phase error to zero.

Figure 3:
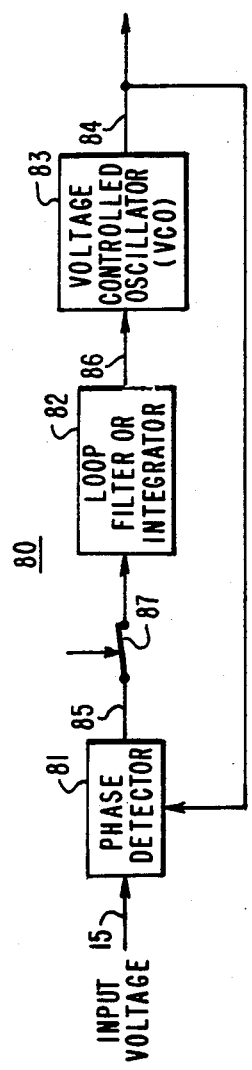
FIG. 3 is a block diagram representation of a phase locked loop circuit utilized in phase locked loop circuit array.

The phase-locked loops PLL2- PLLN in the array 16 can be of the simple, zero phase error type that samples the phase error at cyclic intervals and produce an output that is inverted with respect to the input. When the PLL's are connected in series with their outputs phase inverted, they capture and track each other. The last output of the array 16 should be in phase with the input to the first phase-locked loop PLL1. This is referred to as the tracking mode of operation for the circuit 10. The PLL used in the array 16 is available in single chip, digital integrated circuit such as the RCA CD4046. The RCA CD4046 integrated circuit samples the phase error once on each positive signal transition and ignores the zero crossing on each negative signal transition. A generalized block diagram for PLLN is shown in FIG. 3. There the circuit 80 is comprised of a phase detector 81, a loop filter or integrator 82, and a voltage controlled oscillator (VCO) 83. Serving as inputs to the phase detector 81 are input signal 15 the output 84 of the VCO 83. The output of the phase detector 81 is a phase error signal 85 that represents the phase error between the input signal 15 and the output 84 of the VCO 83. This phase error signal 85 is integrated by the integrator 82 to provide a reference signal 86 as the input to the VCO 83. The magnitude of reference signal 86 causes VCO 83 to vary the frequency of its output 84 so as to drive the phase error signal 85 to zero. At this point the magnitude of reference signal 86 will stabilize and in turn stabilize the frequency of the output 84 of the VCO 83. By providing a switch 87 to open circuit the input to the integrator 82, the output 86 thereof will remain essentially constant, thus preserving the output state of the VCO 83 to that existing just prior to the opening of the switch 87. With the switch 87 open, the PLL circuit acts as a flywheel. With the switch 87 closed, the circuit 80 will lock onto and track the source signal. The switch 87 is installed in at least the last stage of the PLL array 16. The remaining stages of the PLL array 16 operate solely in the tracking mode and do not require the switch.

Figure 4:
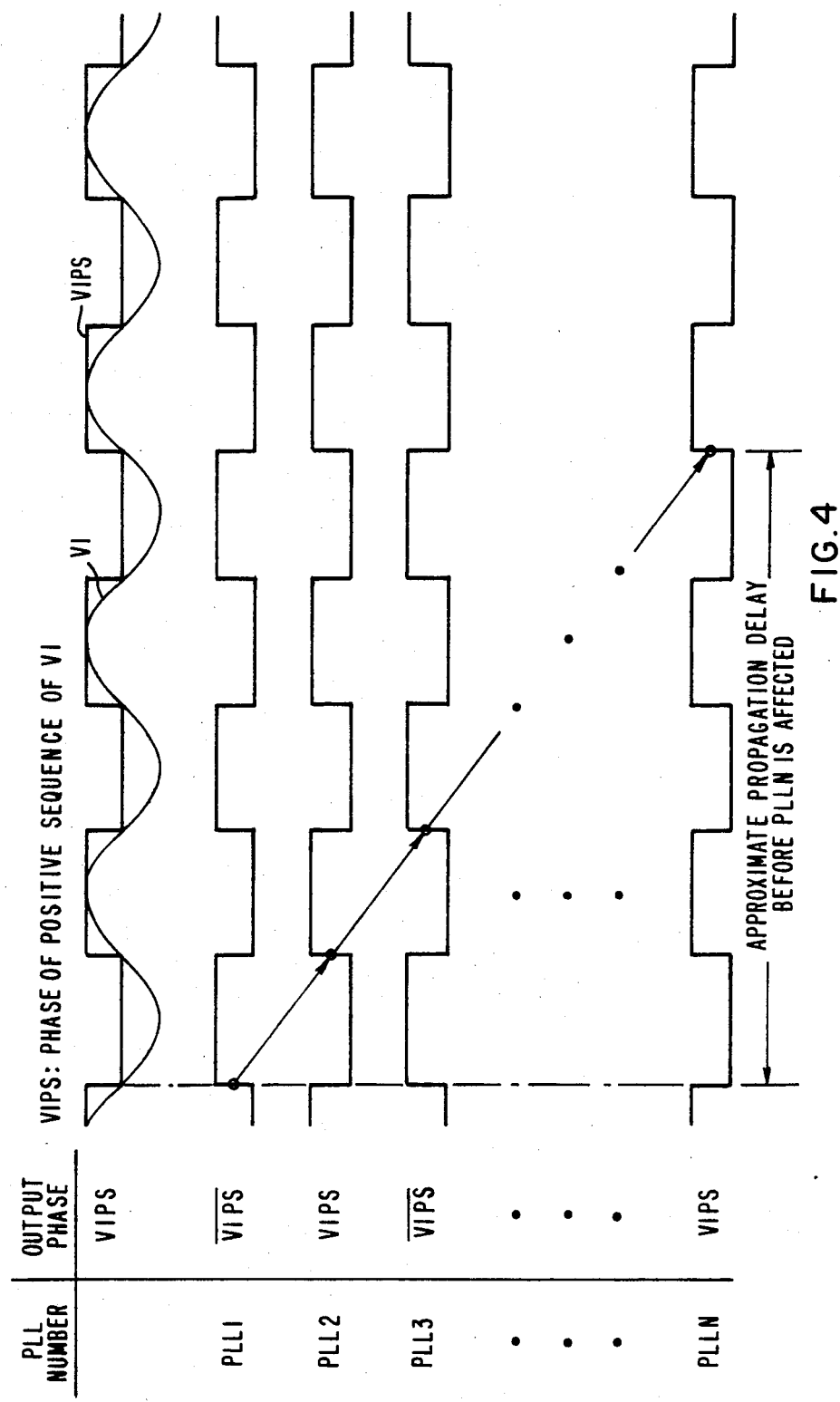
FIG. 4 is an illustration of the phase error propagation delay through the phase locked loop array.

As illustrated in FIG. 4, it takes time for a phase error at the beginning of the PLL array 16 to propagate to the phase-locked loop PLLN. The propagation delay D is approximately proportional to the number of phase detections per cycle, PD, and the total number Y of series connected PLL's. This relationship is given in Eq. (1).

$$D = (PD)(Y-2)/2 \qquad \text{Eq. (1)}$$

where
  D is the propagation delay in cycles;
  PD is the number of phase detections per cycle of a phase-locked loop circuit in the PLL array;
  Y is the total number of series connected phaselocked loop circuits The propagation delay D is selected to be safely longer than the sensing delay of a line fault detector 30. In FIG. 4 the occurrence of the fault condition is indicated by the small "o" on the positive going edge of the waveforms for the signals V1PS and V1PS which represents the noninverted and inverted outputs of the successive stages in the PLL array 16. We have found a propagation delay of one cycle and an PLL array using three of the zero phase error type PLL having one phase detection per cycle sufficient to preserve prefault conditions in the majority of fault occurrences. For this case Y equals 4 which is the total number of series connected phase-locked loop circuits - one being the primary phase locked loop and the other three being the PLL array.

When a line fault occurs, phase-locked loop PLL1 drifts temporarily until the line fault detector 30 picks up. Timing phase errors at this point have no consequences since the SVG cannot control the collapsing electric power system. The phase error starts its propagation down the PLL array 16, but its propagation is intercepted by activation of the two switches 20 and 32 by the line fault detector 30 before it reaches the phase detector of the last PLL. At this point the last stage of the PLL array 16 is in the flywheel mode of the operation with its output 18 now serving as the inputs 24, 26, and 28 to phase-locked loop PLL1 in order to replace the missing system voltages. The phase-locked loop PLLN stays in the flywheel mode until it is switched back to tracking mode after the clearance of the fault. Because the flywheel preserves the pre-fault phase of the power system, all the PLL's in the timing reference generator will regain synchronism before the fault is cleared. After the return of the system voltages, the timing reference signal for the SVG can be based on the replacement voltages or on a sum of the replacement and measured line voltages until the line fault detector confirms, with a delay, the clearance of the fault. After fault clearance, the replacement voltages are removed from the input of PLL1. The small drift of the flywheel stage of the PLL array 16 becomes corrected after the switch 32 is reclosed.

Figure 5:
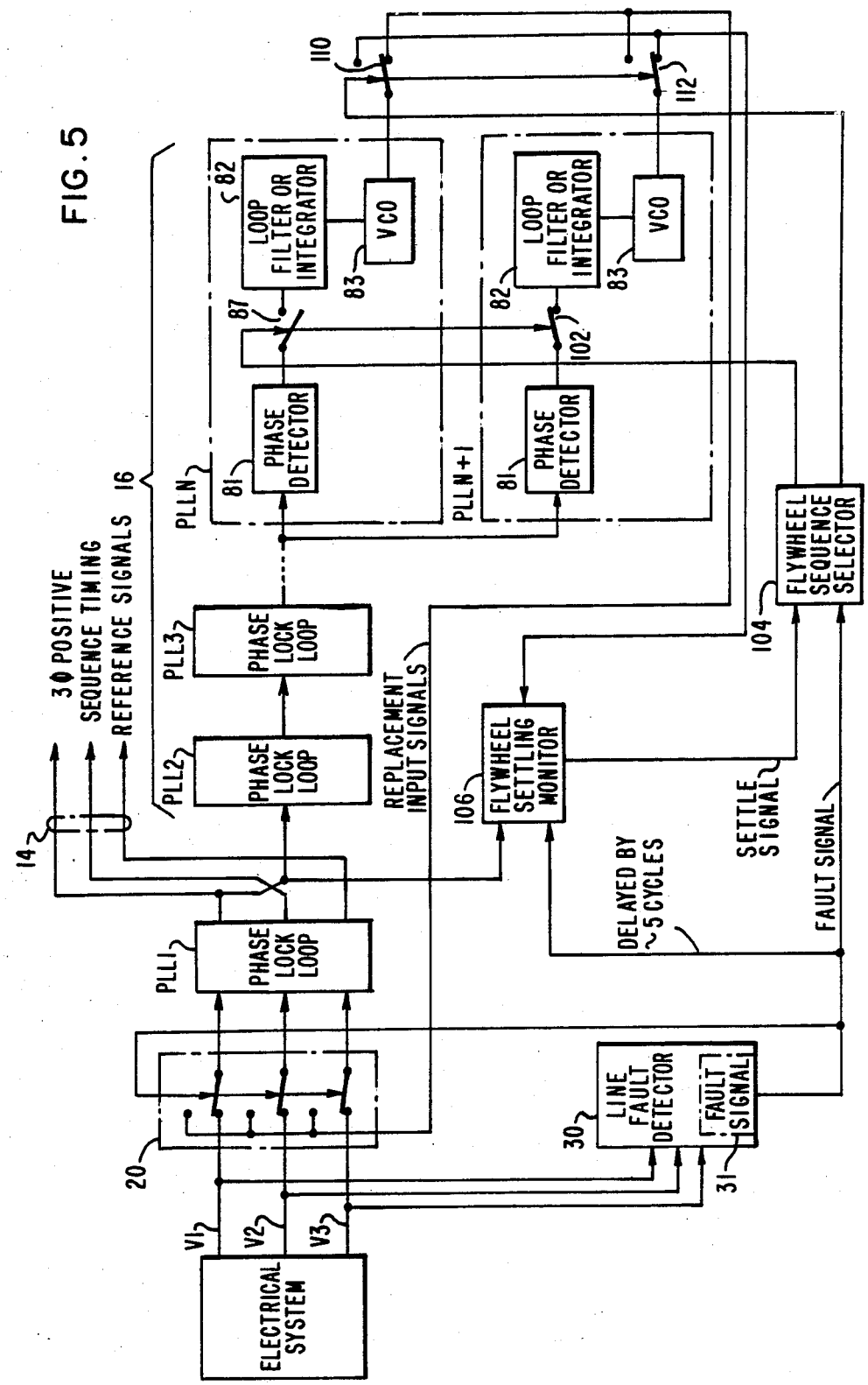
FIG. 5 is a block diagram of an alternate embodiment of the invention that is tolerant of multiple faults.

During the phase settling interval in the PLL array 16 that follows a fault, the signals produced by the phase-locked loop circuits do not accurately represent the system frequency and synchronous phase. Therefore, until each stage in the PLL array 16 is fully settled, the timing reference generator 10 is not ready to handle another fault. Multiple faults can be tolerated if the basic reference timing generator is appended with a second phase-locked loop circuit that is also capable of being operated in a flywheel mode. The multiple-fault tolerant timing reference generator is shown in FIG. 5. There the timing reference generator 10 is substantially the same as that previously described. Accordingly, components having the same or similar functions will have the same reference numerals. In this embodiment, the PLL array 16 further comprises an N+1 PLL stage substantially the same as the Nth stage and connected in parallel therewith. The Nth and N+1 stages receive as their input the output from the N−1 stage of the array 16. Because the Nth and N+1 stages are in parallel, the total propagation delay remains unchanged. A switch 102 is provided for open circuiting the N+1 stage so that it can be operated in the flywheel mode. A sequence selector 104 that is responsive to fault signal 31 produced by the line fault detector 30 is now used to control the operation of the switch 32 as well as that of switch 102. The sequence selector 104 alternately selects between the Nth and N+1 stages for their operation in the flywheel mode during the existence of a fault condition. The sequence selector 104 chooses a stage when a fault signal produced by the fault detector is received. The selected stage is also termed the flywheel stage while the unselected stage is termed the tracking stage. Further operation of the selector is inhibited until the system has settled. This is done to prevent rapid switching between the two PLL stages should multiple faults occur in rapid succession. The sequence selector 104 can be implemented by a flip-flop or other similar logic device.

A flywheel settling monitor 106 is provided for monitoring the phase difference between the outputs of the first phase-locked loop PLL1 and the unselected stage after the fault condition has been cleared. Preferably, the operation of the monitor 106 is delayed in its operation for a time period of about 5 cycles after the fault signal has been cleared to permit transients to subside. When the phase error between monitored outputs is equal to or less than about 1 degree for a time period of about 15 cycles the monitor will produce a settle signal. Other time periods and phase error differences can be chosen dependent on the requirements of the system. This settle signal is used to enable the sequence selector 104. Until the settle signal is produced, the sequence selector 104 is inhibited from further switching between the Nth and N+1 stages of the PLL array 16 even though the line fault detector 30 has indicated that another fault condition has occurred. After fault clearance, the unselected stage is allowed to recapture and track, while the selected stage still flywheels. Only after the confirmation of the settling of the tracking stage is the still activated flywheel stage allowed again to track. If a second line fault occurs while the unselected stage is still settling, the output of the flywheel stage will be fed to PLL1. With this technique, repetitive faults can be handled for approximately sixty line voltage cycles. Beyond this time a period of no line faults is required that exceeds the flywheel settling time. Such a severe line fault sequence is not expected to occur on high power electric transmission lines.

Two single pole two position switches 110 and 112 controlled by the sequence selector 104 are used to route the outputs the Nth and N+1 stages to their proper destination depending on if they are the selected or unselected stage. For example, where the Nth stage is selected to be the flywheel its output is routed via the switch 110 to the input of the first phase-locked loop to replace the lost source voltage signals. Simultaneously, the output of the unselected N+1 stage which is considered to be in the tracking mode is provided as one of the inputs to the flywheel settling monitor 106. If the N+1 stage was selected, the switches 110 and 112 would be toggled to their other positions causing the output of the Nth stage to be sent to the monitor 106 and the output of the N+1 to be used as the replacement for the lost source signal.

The replacement voltages generated by the array stage being used a flywheel may be square or sine wave signals. The use of sine waves provides a smaller transient following a replacement voltage switching. Further a single phase signal or a multiphase signal having a predetermined phase relationship between the phases thereof can be provided as the replacement inputs to the first phase-locked loop PPL1. Other embodiments of the invention will be apparent to those skilled in the art from consideration of the specification or from practice of the invention disclosed herein. It is intended that the specification be considered as exemplary only with the scope and spirit of the present invention being indicated by the following claims.

We claim:

1. A timing reference generator producing a multiphase timing reference signal substantially in synchronism with a multiphase source signal, comprising:

primary phase locked loop (PLL) circuit means for locking on and tracking an input signal representative of the multiphase source signal when at least one phase thereof is present and producing the multiphase timing reference output signal based on the positive sequence component of the input signal, the primary PLL circuit means maintaining a predetermined phase relationship between the input signal and the timing reference output signal and including at least one harmonic band reject notch filter to substantially eliminate phase errors in the timing reference output signal caused by input signal phase unbalance and harmonics;

PLL circuit array means having N PLL stages connected in series for providing a delayed timing reference signal, each PLL stage having an input and output and comprising a zero phase error type PLL circuit operable in a tracking mode in which the phase error between the input and output thereof is sampled on a predetermined cyclic basis with the output thereof being inverted and delayed with respect to the input with at least the Nth stage also being operable in a flywheel mode in which the PLL stage is open circuited with the output thereof becoming independent of the input and remaining essentially unchanged from its tracking mode stage existing just prior to entering the flywheel mode, the initial stage of the PLL array means having as the input thereto at least one phase of the timing reference output signal with each subsequent stage receiving the output of the preceeding stage, the output of the Nth stage being in phase with the input to the primary PLL circuit means and having a propagation delay D determined by the sum of the delays provided by each of the stages in the array means;

fault detector means having a response time that is less than the propagation delay D for determining the presence of a fault condition in the multiphase source signal and providing a fault signal as an output thereof;

switching means responsive to the fault signal for opening circuiting at least the Nth stage of the PLL array means during the fault condition to place the Nth stage in the flywheel mode thereby preserving the prefault phase conditions of the source signal as represented by the output of the Nth stage; and feedback means responsive to the fault signal for supplying the output of the Nth stage of the PLL array to the input of the primary PLL circuit means during the fault condition.

2. The timing reference generator of claim 1 wherein the feedback means further comprises means for generating replacement signals for each of the phases in the multiphase source signal based on the delayed timing reference output of the Nth stage of the PLL array means.

3. The timing reference generator of claim 1 further comprising:

the PLL array means further comprising an N+1 PLL stage substantially the same as the Nth stage and connected in parallel therewith and receiving at the input thereof the output from the N−1 PLL stage;

sequence selector means responsive to the fault signal for alternately selecting between the Nth and N+1 stages with the selected stage operating in the flywheel mode during the existence of a fault condition, the sequence selector means including means for inhibiting further selection between stages until a settle signal is received;

the switching means further being responsive to the sequence selector means for open circuiting the PLL stage selected by the sequence selector means; and flywheel settling monitor means reponsive to the fault signal for monitoring phase difference between the output of the unselected stage of the array and the output of the primary PLL circuit means after the fault signal has been cleared, the monitored means producing the settle signal as an output when the phase difference between the monitored outputs remains about a predetermined amount for a predetermined number of cycles.

4. The timing reference generator of claim 3 further comprising a delay means for providing a predetermined delay in the response of the monitoring means after the clearing of the fault signal.

5. The timing reference generator of claim 4 wherein the number of phases is three.

6. The timing reference generator of claim 5 wherein the predetermined delay in provided by the delay means is about 5 cycles and the predetermined amount of phase error between the monitored outputs is equal to or less than 1 degree for a predetermined number of cycles equal to or greater than about 15 cycles.

7. The timing reference generator of claim 1 wherein the total propagation delay D is established by the formula $$D = (PD)(Y-2)/2$$

where
D is the propagation delay in cycles
PD is the number of phase detections per cycle of a phase-locked loop circuit in the PLL array
Y is the total number of series connected phase-locked loop circuits in the timing reference generator.

8. The timing reference generator of claim 1 wherein the total propagation delay D is one cycle.

* * * * *